Figure 1:
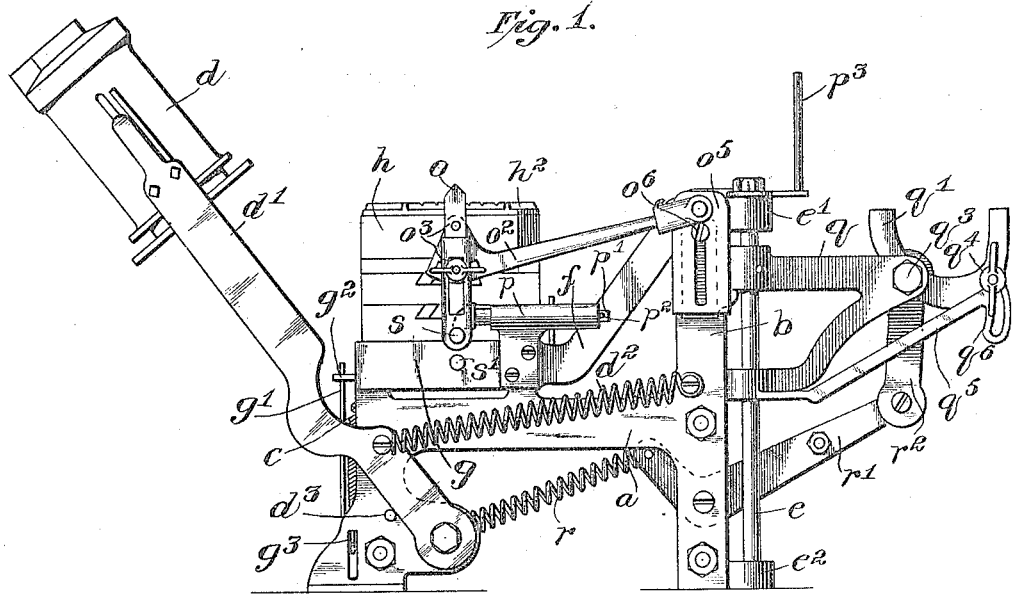

A. M. LOUDON & J. GOW.
A. M. LOUDON & H. W. PHILBROOK, ADMINISTRATORS OF J. GOW, DEC'D.
MOLDING MACHINE.
APPLICATION FILED JAN. 13, 1913.

1,135,120.

Patented Apr. 13, 1915.
2 SHEETS—SHEET 1.

A. M. LOUDON & J. GOW.
A. M. LOUDON & H. W. PHILBROOK, ADMINISTRATORS OF J. GOW, DEC'D.
MOLDING MACHINE.
APPLICATION FILED JAN. 13, 1913.
1,135,120.
Patented Apr. 13, 1915.
2 SHEETS—SHEET 2.
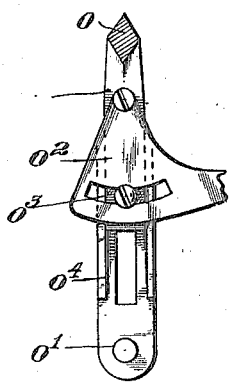
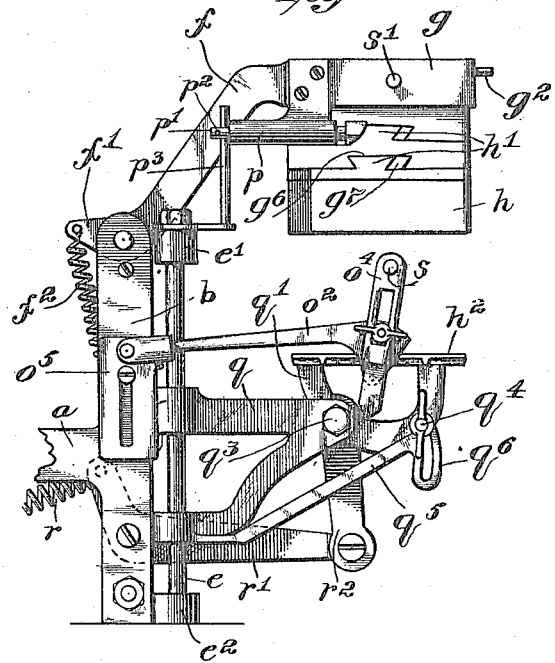
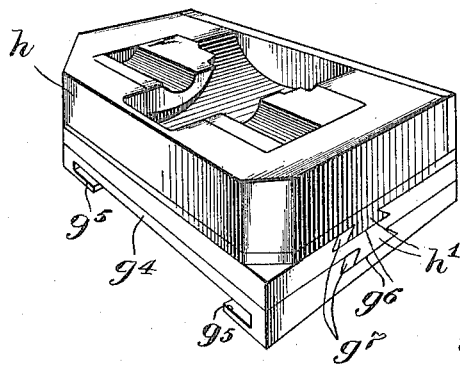
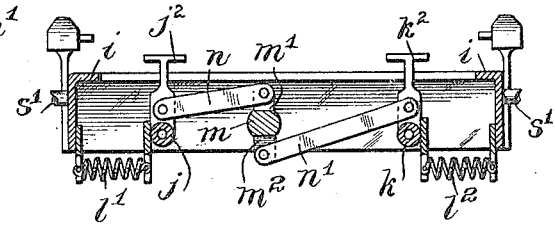

UNITED STATES PATENT OFFICE.

ARCHIBALD M. LOUDON, OF ELMIRA, AND JOHN GOW, DECEASED, LATE OF SCHENECTADY, NEW YORK, BY ARCHIBALD M. LOUDON, OF ELMIRA, NEW YORK, AND HORACE W. PHILBROOK, OF SCHENECTADY, NEW YORK, ADMINISTRATORS.

MOLDING-MACHINE.

1,135,120.     Specification of Letters Patent.     Patented Apr. 13, 1915.

Application filed January 13, 1913. Serial No. 741,608.

*To all whom it may concern:*

Be it known that I, ARCHIBALD M. LOUDON, a citizen of the United States, residing at Elmira, in the county of Chemung and State of New York, and JOHN GOW, deceased, formerly a citizen of the United States, residing at Schenectady, in the county of Schenectady and State of New York, did jointly invent certain new and useful Improvements in Molding-Machines, of which the following is a specification, reference being had therein to the accompanying drawings, which form a part thereof.

Said invention relates to molding machines and more particularly to a type of rockover molding machine.

The main object of the invention is to provide a rockover molding machine wherein the mold, flask or core box may be quickly mounted upon the rockover frame and be secured in place by automatically acting retaining means which will accurately center the mold, flask or core box with relation to the ram, and hold it securely in place when it is being filled.

A further object is to provide in such a machine retaining means which will automatically adjust itself to coöperating members on the mold, flask or core box, and set and remain fixed in any position, thus compensating for irregularities in different molds, flasks and core boxes and wear occurring thereon.

A still further object is to so arrange such retaining means that sand, loam or other molding material cannot accumulate about or clog this mechanism.

A still further object is to provide a machine of this character wherein means are provided whereby molds, flasks or core boxes of varying depths may be used, thus giving a wide range of utility to the machine.

A still further object is to provide such a machine wherein the mold, flask or core box will be firmly held upon the rockover frame, thus permitting the rapid operation of the machine without likelihood of a displacement of the mold, flask or core box.

A still further object is to provide a machine of this character wherein the core or pattern may be drawn perfectly straight and true irrespective of its contour, thus insuring sharpness of the edges of the core or molding.

A still further object is to provide a bottom-board clamp construction which may be automatically locked with relation to the rockover frame and automatically released when the frame is in its operative relation to the drawing table, said clamp being capable of such adjustment as to be accurately fitted to molds, and to hold the bottom board firmly in place while the carrier is being inverted or rocked over.

A still further object is to provide a drawing table which will always have a directly vertical movement while being capable of adjustment to vary the angle thereof to conform to that of the bottom of the mold, flask or core box.

A still further object is to provide a rockover frame adapted to bring the bottom board level upon the table, and have slight movement with the table to insure the core or pattern being drawn straight and true, the movement of the frame with the table being automatically checked and the bottom board simultaneously released.

A still further object is to provide a clamp which after being disconnected from the rockover frame will have a lineal traverse with the drawing table to prevent any possible movement of the board during the drawing operation.

A still further object is to provide a clamp wherein that portion thereof engaging the bottom board, and that portion thereof engaging the rockover frame, may be so adjusted as to be accurately fitted to a mold, flask or core box, and at the same time so adjusted relative to the pivotal arms carrying it that there will be no likelihood of the clamp locking means being accidentally released while the frame is being rocked over. And a still further object is to provide a drawing table which will be so supported and so locked in any adjusted position as to avoid any such instability as would result in its working out of true or being temporarily tilted when being forced downwardly to draw the pattern or core.

The invention consists primarily in a molding machine embodying therein a mold, flask or core box carrying frame, oppositely disposed jaws thereon adapted to have movement toward and from each other, automatically acting means adapted to simultaneously move said jaws in opposite directions to set them upon coöperating members on a mold, flask or core box, and means whereby said jaws may be actuated in opposition to said means to permit the mounting of a mold, flask or core box upon or its removal from said frame; and in such other novel features of construction and combination of parts as are hereinafter set forth and described, and more particularly pointed out in the claims hereto appended.

Figure 2:
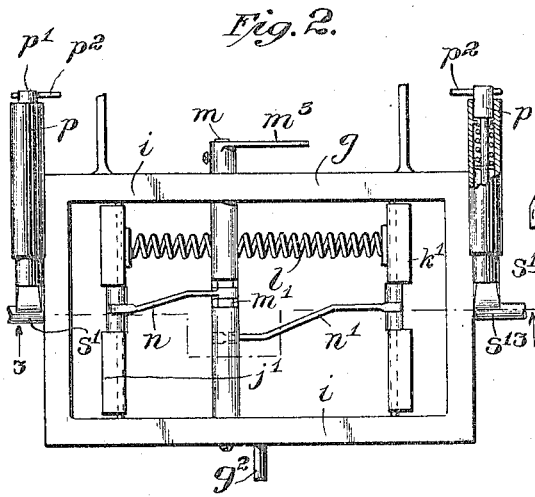
Figure 3:
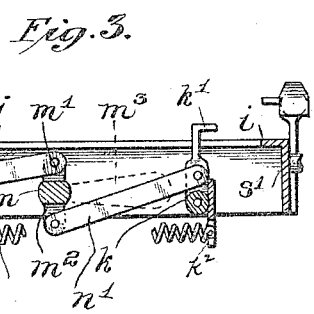

Referring to the drawings:—Figure 1 is a side elevation of a machine embodying the invention, preparatory to drawing the core or mold; Fig. 2 is a plan view of the table support of the rockover frame; Fig. 3 is a transverse section thereof; Fig. 4 is a detail view of the drawing table showing the position of parts after a core or mold has been drawn; Fig. 5 is a detail view of the adjusting means for the clamp bar; Fig. 6 is a detail view of the table board construction; and Fig. 7 is a transverse section similar to Fig. 3, showing the jaws movable toward the center.

Like letters refer to like parts throughout the several views.

In the accompanying drawings only one side of the machine is shown, the other side thereof being a duplicate of that shown so that a showing thereof is unnecessary to an understanding of the invention.

In the embodiment of the invention shown in the drawings, $a$, indicates a side frame of the machine, carrying standards $b$ at one end thereof and a bed $c$ at the other end thereof adapted to support and sustain the mold carrying frame while the mold, flask or core box is being charged and the charge rammed. Adjacent to the bed $c$ is a pneumatic or other form of ram $d$ supported upon arms $d'$ pivotally mounted below the table $c$ so as to permit said ram to be swung into and out of position relative to the mold, flask or core box.

To compensate for the weight of the ram $d$ and act similarly to a counterweight, a spring or springs $d^2$ are provided, one end of which is secured to the levers $d'$ and the other end to the frame of the machine. These springs not only prevent a too rapid movement of the arms $d'$, but also aid in bringing the ram to the operative position. To limit the expansion of these springs, the stops $d^3$ engaging the arms $d'$ are provided.

Adjacent to the standards $b$ are guides $e$ for the drawing table supporting frame, the top of each of said guides being provided with a stop $e'$ and the bottom thereof with a stop $e^2$ for limiting the movement of said supporting frame. Pivotally mounted upon the standards $b$ are the arms $f$ and supported by said arms is the rockover frame $g$ adapted to carry the mold, flask or core box indicated in the drawings at $h$. This frame $g$ is adapted to rest, and be locked in position, upon the table $c$, so as to be held firmly in position while the mold, flask or core box is being charged. The locking means comprises an oscillatory latch $g'$ adapted to engage a stud $g^2$ upon said frame $g$, the treadle $g^3$ extending to each side of the machine being adapted to oscillate said latch to release said frame.

Extending beyond the pivotal point of the arms $f$ are the short arms $f'$ to which are attached the springs $f^2$ connected to the frame of the machine, which springs have the twofold function of aiding in rocking the frame toward the drawing table and retarding its movement after said frame and the load carried thereby have passed the vertical center of the machine.

In machines of this character it is desirable to so construct and arrange the rockover frame as to permit a mold, flask or core box to be quickly mounted thereon and to be quickly centered and trued up upon the frame; and at the same time the means utilized for securing this result must be adapted to hold the mold, flask or core box firmly upon the rockover frame so as to prevent a jarring thereof as the said frame is rocked over for drawing purposes.

The construction of the rockover frame is most clearly shown in Figs. 2 and 3. The frame $g$ is formed of a rectangular rim having top flanges $i$ adapted to receive the mold, flask or core box $h$, or a baseboard upon which the same is adapted to be mounted. Pivotally mounted within this frame upon each side of the longitudinal center thereof are oscillatory levers $j$ $k$ the upper ends of which are provided with overhung jaws $j'$ $k'$ extending at substantially right angles to said levers and projecting in opposite directions. Acting upon said jaws to normally set same is a spring $l$, the opposite ends of which are connected to the arms $j^2$ and $k^2$ carried by the levers $j$ and $k$ respectively. Intermediate the levers $j$ $k$ is a crank shaft $m$ pivotally mounted in the frame $g$, the oppositely set cranks $m'$ $m^2$ of said shaft being connected to the levers $j$ $k$ by means of the links $n$ $n'$. Controlling the said crank shaft $m$ is an operating hand lever $m^3$ mounted upon an end of said shaft protruding beyond the frame $g$ so as to bring this lever in a position where it will not interfere with the mold, flask or core box mounted upon said frame. The crank shaft $m$ and its operating hand lever $m^3$ are provided to actuate said jaws in opposition to said spring $l$ and thus permit the mounting of a mold, flask or core box upon the frame $g$, or its removal therefrom. In connection with a rockover frame of this character a baseboard $g^4$ is preferably used, which baseboard is provided on the under side thereof with angular cleats $q^5$ adapted to pass within the end flanges $i$ and be engaged by the jaws $j'$ $k'$ to seat and lock this baseboard upon the machine. The upper face of this baseboard is provided with a dovetailed slot $q^6$, adapted to receive a coöperating tongue $h'$ upon the mold, flask or core box $h$, a wedge $g^7$ being used to lock these members together.

In order to adapt the machine to molds, flasks or core boxes of different depths, one or more supplemental baseboards may be used, each of which upon opposite sides thereof carries a dove tail groove and tongue adapted to be utilized in connecting each said board upon the board below same by means of a wedge, and is adapted to have a mold, flask or core box mounted thereon in the manner heretofore referred to. By this construction any mold, flask or core box may be brought to the desired height.

The bottom board which must be applied to the mold, flask or core box to permit the frame $g$ to be rocked over is shown at $h^2$, clamping means adapted to be attached to said frame prior to its being rocked over and to be simultaneously and automatically disconnected therefrom when it is desired to draw the core or mold, being provided for holding said bottom board in position during this step in the operation of the machine. This clamping mechanism comprises a clamp bar $o$ having pendant legs carrying studs or pins $o'$, by means of which the clamp bar may be locked in its adjusted position upon said bottom board. To facilitate the locking and the automatic release of this clamp bar, it is supported independently of the rockover frame while being at the same time permitted to have a pivotal movement in unison with the frame or independently thereof. This support comprises side arms $o^2$ one end of which is pivoted adjacent to the standards $b$ and the other end of which is connected to the legs of the gripper bar. To facilitate the adjustment and fitting of the clamp bar to molds, flasks or core boxes having different depths, each leg is formed of two sections $o^3$ and $o^4$, one of which, $o^4$, is slotted and slidable upon, and adapted to be connected to, the other by means of the set screw shown more particularly in Figs. 4 and 5 of the drawings. By this construction the coupling stud or pin $o'$ may be set accurately with relation to the coöperating latch mechanism carried by the rockover frame $g$ which will be more fully referred to hereinafter. To facilitate a still further adjustment of the legs of the clamp bar to control the point of release of the bottom board prior to the drawing operation, the section $o^3$ of each leg is pivotally connected with the arm $o^2$ and said arm is provided with an enlarged portion having a segmental slot therein, thus permitting a circumferential adjustment of the stud or coupling $o'$ about the center of the pivotal connection between the arm $o^2$ and the section $o^3$. To permit a nice adjustment of the center of rotation of the arms $o^2$, they are mounted upon a vertically slidable plate $o^5$ which plate may be set by means of the set screw $o^6$ in any desired adjusted position. By means of the adjustment described, the arc described by the clamp bar may be so proportioned to the arc described by the frame $g$ as to prevent any loosening of the bottom board during the operation of rocking over said frame.

Carried at each side of the frame $g$ is a cylinder or housing $p$ having mounted therein a spring pressed plunger $p'$ the forward end of which is formed into a beveled latch piece, the bevel of which is adapted to be engaged by the stud or coupling member $o'$ when the clamp bar is applied to the mold, flask or core box upon said frame, said stud or coupling member being adapted to engage a plane surface opposite said beveled surface to retain the clamp bar in the locked position. The rear end of the plunger $p'$ projects through the casing $p$ and has a laterally projecting stud or abutment $p^2$ by means of which the latch is withdrawn to disengage the clamp bar $o$ from the bottom board.

Adjacent to the standards $b$ and guides $e$ are the vertically projecting posts $p^3$ extending into the path of the studs or pins $p^2$ in a manner to engage them toward the end of the movement of the rockover frame. These posts have the twofold function of retracting the plungers $p'$ and limiting the movement of the rockover frame in a manner to check it when it is in the desired position relative to the drawing table to insure the true and straight drawing of the mold, pattern or core.

Slidably mounted upon the guides $e$ is the frame $q$ which carries the drawing table.

The table proper is shown at $q'$ and is supported by the bars $q^3$ and $q^4$ carried respectively by the frame $q$ and the strut $q^5$ projecting from the lower portion thereof. To facilitate the angular adjustment of the table $q'$, it is provided with the extension $q^6$ having a segmental slot therein through which the bar $q^4$ projects and clamping means being provided to set the table after the desired adjustment thereof has been secured. The bar $q^3$ forms the pivot about which the table $q'$ rotates. This construction gives the desired stability to the table and permits it to be moved vertically under the control of the frame $q$ without likelihood of such a displacement thereof as would cause any such movement in drawing the mold, pattern or core, as would injure the same.

The frame $q$ is normally thrust upwardly by means of a spring $r$ acting upon the toggle levers $r'$ $r^2$, the first of which has a short arm acted upon by said spring $r$. The lever $r^2$ is connected to the said frame $q$ adjacent to the rod $q^3$, thus lending support to said table adjacent to the point of greatest load and tending to avoid the table being forced out of true while the drawing operation is in progress. The spring $r$ is expanded during the drawing operation and will thus automatically restore the table to its normal position when the frame $q$ is released. The toggle lever construction permits a directly vertical movement of the table.

The plates $o^5$ are mounted upon and movable with the frame $q$, thus causing the entire clamp bar mechanism to descend with the frame as the mold, pattern or core is drawn, and preventing any possibility of a displacement of the bottom board during the drawing operation, which displacement would tend to impart movement to the mold, pattern or core being drawn, and thus tend to disturb the surface or edges thereof.

In the preferred form of the invention, the jaws $j'$ $k'$ are shown as extending outwardly from the center line of the rockover frame, with but a single spring acting upon both levers $j$ $k$. In the modification shown in Fig. 7, however, both inwardly and outwardly extending jaws $j^2$—$k^2$, and springs $l'$ $l^2$ acting respectively upon the jaws $j^2$—$k^2$ to force them toward the center line of the frame, are shown. The operation of this form of the invention is substantially identical with that of the preferred form.

The legs $o^3$ $o^4$ are provided with a handle $s$ at the free end thereof which handle is adapted to be positioned adjacent a similar handle $s'$ upon the frame $g$ to permit the operator to accomplish the complete rocking over of said frame and to insure the actuation of the clamp mechanism in applying it to the mold or core box.

The operation of the herein described molding machine is substantially as follows:—The operation of the machine will be described in connection with the production of cores, this being the field of greatest utility of the device and one in which rapidity of operation is particularly desirable. In preparing the machine for operation, the rockover frame $g$ is swung to the left, against the tension of the springs $f^2$ until it comes to rest upon the table $c$ and the latch $g'$ and $g^2$ becomes operative to hold it upon said table. When the frame is in this position, it rests firmly in place until the core box is charged and rammed, and the core is to be drawn. The rockover frame having been thus set, the baseboard $g^4$ is mounted thereon with the cleats $g^5$ within the flanges $i$. Prior to mounting the board thereon, the hand lever $m^3$ is actuated to move the levers $j$ $k$ away from each other, thus affording clearance for the cleats between and adjacent to the jaws $j'$ and $k'$. The said base board will then drop freely to place upon the frame $g$ and with the release of the lever $m^3$ the spring $l$ will immediately move said jaws in opposite directions to cause them to automatically engage the cleats $g^5$ and lock said baseboard in position upon the machine. If the board be placed upon the frame off center, the movement of the jaws $j'$ $k'$ in opposite directions will bring this board to center upon said frame, the movement of said jaws being simultaneous and equal. In setting upon the cleats, the jaws $j'$ $k'$ after passing the vertical center will move in a slightly downward arc, thus serving to force the baseboard firmly against the seat upon the frame $g$ formed by the flanges $i$. The hand lever $m^3$ will always act in opposition to the spring $l$, thus causing the automatic action of the jaws above referred to.

In the modification shown in Fig. 7, the operation is identical with that heretofore described with the exception that the springs $l'$ and $l^2$ act in a direction opposite to that of the spring $l$, the movement of the jaws in this form of the invention also being in opposite directions and having the same centering effect as in the preferred form.

The mounting of the baseboard and its centering and truing up is thus automatically accomplished, and in case of irregularities in the cleats $g^5$ or in case of the use of molds, flasks or core boxes, of different dimensions within the range of operation of the jaws $j'$ $k'$, the action of the spring $l$ will be such as to automatically compensate for any such variances and to have the same mode of operation under all such conditions.

The compounding of the leverage between the lever handle $m^3$ and the projections $j^2$ $k^2$ of the levers $j$ $k$ will permit the convenient actuation of the jaws in mounting or removing the base board from the rockover frame, and the action of the spring $l$ will be sufficiently positive at all times to insure a firm setting of the baseboard and prevent accidental displacement thereof through continued use of the machine with the mold, flask or core box thereon. A mold, flask or core box having been mounted upon said rockover frame, it is charged with sand or loam and the arms $d'$ oscillated to bring the ram $d$ vertically over said mold, flask or core box, the springs $d^2$ aiding in this movement of said ram. The charge is then rammed and the top of the charge is scraped to remove surplus sand or loam, and the bottom board $h^2$ used to close the mold, flask or core box. The clamp bar $o$ is then swung toward the frame $g$ the pins $o'$ upon the legs $o^3$ and $o^4$ being forced against the latch end of the plungers $p'$ forcing them inwardly against the tension of their springs until the plunger is permitted to escape over the said pins, thus holding the clamp bar $o$ firmly upon the bottom board $h^2$ and preventing movement thereof relative to the mold, flask or core box. If it be found that play exists between the clamp $o$ and the bottom board $h^2$, or if it be found that the latch pins $o'$ do not properly engage the said plungers $p'$, the legs $o^3$ $o^4$ may be lengthened or shortened and the pins $o'$ moved toward or from the bar $o$ so as to bring the clamp bar firmly upon the bottom board and accurately position the pins $o'$ relative to the latch portion of the plunger $p'$. This same adjustment may be utilized in changing the mold, flask or core box upon the frame $g$ in case the different molds, flasks or core boxes are not of the same height. The mold being thus properly charged and the ram $d$ restored to its former position, which restoration occurs prior to the placing of the bottom board and the actuation of the clamp, the treadle $g^3$ is actuated to release the latch mechanism $g'$ and $g^2$ thus permitting the frame $g$ to be rocked over, the springs $f^2$ assisting in this action until the arms $f'$ have passed their vertical center, whereupon these springs will retard the descent of the frame $g$ and its load. Thereupon the operator uses the handles $s$ $s'$ upon the legs $o^3$ $o^4$ and frame $g$ respectively, and forces the said frame toward the drawing table $q'$. As the bottom board $h^2$ approaches this table and is about to come to rest thereon, the pins $p^2$ engage the posts $p^3$ and with the continued downward movement of the frame $g$, simultaneously with the downward movement of the table $q'$ the plungers $p'$ will be retracted within their cylinders $p$ and thus permit the pins $o'$ to escape therefrom, releasing the clamp and permitting it to drop from the bottom board. Thereafter the frame $q$ is forced downwardly, the frame $g$ being held in the parallel position by the operator, the plunger $p'$ and pins $p^2$ thereon and posts $p^3$ defining the position of this frame and maintaining it in parallelism with the drawing table $q'$. This insures a perfectly straight drawing of the pattern or core. The pivotal point of the side arms $o^2$ moving vertically with the frame $q$ prevents any lateral play with the clamp bar $o$ and thus avoids any possibility of such a movement of the bottom board $h^2$ as might injure the mold or core during the drawing operation. When the drawing operation is completed the spring $r$ will, through the levers $r'$ $r^2$, restore the drawing table to its normal position, and the spring $f^2$ will automatically tend to restore the rockover frame $g$ to its normal position, the handles $s'$ being utilized by the operator in positioning the frame $g$ upon the table $c$ and actuating the latch $g'$ $g^2$.

Through the adjustment of the pivotal point of the arms $o^2$ through the manner of mounting the plate $o^5$, the arc described by said arms at the point of connection with the legs $o^3$ $o^4$ may be so adjusted as to prevent any loosening of the bottom board while the frame is being rocked over.

If it be found in actuating the machine that the release of the bottom board is not timely, the legs $o^3$ $o^4$ may be moved toward or from the plunger $p'$ by means of the segmental slot in, and the pivotal connection between said legs and, the arms $o^2$.

If the mold, flask or core box has an irregularly shaped top, the drawing table $q'$ may be adjusted from the horizontal position in the manner heretofore referred to to accommodate this table to the plane of the bottom board $h^2$ when it engages therewith. Under all conditions, however, the pattern or core is drawn in a straight line, thus avoiding damage to the mold or core.

A molding machine such as is herein described may be rapidly operated by unskilled labor, no seting of the mold, flask or core box being required, the divergent points of engagement of the jaws $j'$ $k'$ and their lateral movement under spring tension automatically centering and truing up the mold.

In drawing, it is merely required that the operator, after the frame $g$ has ceased its rockover movement, depress the frame $q$ by applying his weight thereto, and if the pattern or core does not draw perfectly free, tap the frame $g$ so as to loosen the same. This also serves to insure greater accuracy in the core or mold.

The vertical guides $e$ and the divergent bearings upon the frame $q$ insure against movement in the drawing table other than direct vertical movement and the arrangement of the levers $r'$ $r^2$, also aid to this same end.

It being apparent that changes may be made in the design of the machine from that shown in the accompanying drawings, without departing from the spirit and scope of the invention, it is not intended to limit the claims to the precise details of construction shown in the drawings.

Having described the invention, what is claimed as new and desired to have protected by Letters Patent, is:—

1. A molding machine embodying therein a mold, flask or core box carrying frame, oppositely disposed jaws thereon adapted to have movement toward and from each other, automatically acting means adapted to simultaneously move said jaws in opposite directions to set them upon coöperating members on a mold, flask or core box, rigid links connected with said jaws respectively, and a manually operative crank shaft connected with the said links whereby said jaws may be simultaneously actuated in opposition to said automatically acting means to permit the mounting of a mold, flask or core box, upon or its removal from, said carrying frame.

2. A molding machine embodying therein an invertible mold, flask or core box carrying frame, oppositely disposed oscillatory jaws thereon adapted to have movement toward and from each other, automatically acting means adapted to simultaneously move said jaws in opposite directions, to set them upon coöperating members on a mold, flask or core box, rigid links connected with said oscillatory jaws respectively and a manually operative crank shaft connected with the said links whereby said jaws may be simultaneously reciprocated in opposition to said automatically acting means to permit the mounting of a mold, flask or core box upon, or its removal from, said frame.

3. A molding machine embodying therein a mold, flask or core box, carrying frame, oppositely disposed jaws thereon adapted to have movement toward and from each other, a spring acting on each of said jaws to normally move said jaws into engagement with coöperating members on a mold, flask or core box, a rigid link connected with each of said jaws, and a manually operative crank shaft connected with said links whereby said jaws may be simultaneously actuated against the spring tension tending to set said jaws to permit the mounting of a mold, flask or core box upon, or its removal from, said frame.

4. A molding machine embodying therein a mold, flask or core box carrying frame, oppositely disposed, oscillatory jaws thereon adapted to have movement toward and from each other, a spring connecting said jaws acting to impart simultaneously movement thereto to bring them into engagement with coöperating members on a mold, flask or core box, rigid links connected with each of said jaws and a manually operative crank shaft connected with said links whereby said jaws may be simultaneously actuated against the tension of said spring to permit the mounting of a mold, flask or core box upon, or its removal from, said frame.

5. A molding machine embodying therein a mold, flask or core box carrying frame, oscillatory, parallel shafts mounted thereon adjacent opposite sides thereof, jaws carried by said shafts respectively, a spring acting on said shafts to normally oscillate them in opposite directions, a manually operative shaft having oppositely set cranks intermediate said shafts, and links pivotally connected respectively to said cranks and said jaws, whereby said jaws may be opened against the tension of said spring.

6. A molding machine embodying therein an invertible mold, flask or core box carrying frame, means adapted to secure a bottom board to a mold, flask or core box thereon, including therein a clamp bar adapted to engage a bottom board, a swinging support therefor, latch pins carried thereby and coöperating means carried by said frame comprising a plurality of cylinders and a spring pressed plunger in each, adapted to engage said pins, and means whereby when said frame is inverted, said plungers may be retracted to release said clamp bar.

7. A molding machine embodying therein an invertible mold, flask or core box carrying frame, means adapted to secure a bottom board to a mold, flask or core box thereon, including therein a clamp bar adapted to engage a bottom board, a swinging support therefor, latch pins carried thereby, coöperating means carried by said frame comprising a plurality of cylinders and a spring pressed plunger in each, adapted to engage said pins, and means adjusting said pins toward or away from said clamp bar whereby said bar may be set to molds, flasks or core boxes of different heights, and means whereby when said frame is inverted, said plungers may be retracted to release said clamp bar.

8. A molding machine embodying therein an invertible mold, flask or core box carrying frame, means adapted to secure a bottom board to a mold, flask or core box thereon, including therein a clamp bar adapted to engage a bottom board, a swinging support therefor, latch pins carried thereby and coöperating means carried by said frame comprising a plurality of cylinders and a spring pressed plunger in each, adapted to engage said pins, means whereby when said frame is inverted, said plungers may be retracted to release said clamp bar, and means whereby said pins may be adjusted toward or from said plunger to vary the operative interval of said last named means.

9. A molding machine embodying therein an invertible mold, flask or core box carrying frame, means adapted to secure a bottom board to a mold, flask or core box thereon including a plurality of swinging arms, a clamp bar, pendant legs each comprising two sections, one of each of which is connected with said clamp bar and one of said arms, and the other of each of which is movable toward or from said clamp bar, and coöperating means carried by said frame comprising a plurality of cylinders and a spring pressed plunger in each, adapted to engage said pins, and means whereby when said frame is inverted, said plungers may be retracted to release said clamp bar.

10. A molding machine embodying therein an invertible mold, flask or core box carrying frame, means adapted to secure a bottom board to a mold, flask or core box thereon, including a clamp bar, latch pins carried thereby, coöperating means carried by said frame, comprising a plurality of cylinders and a spring pressed plunger in each adapted to engage said pins, oscillatory arms, and connecting means between said arms and said clamp bar including therein a set screw adapted to have movement in a segmental slot, whereby said pins may be adjusted toward or from said plungers and means whereby when said frame is inverted, said plungers may be retracted to release said clamp bar.

11. A molding machine embodying therein a main frame, a rockover frame mounted thereon, a table adjacent to one end of said main frame and adapted to receive said rockover frame, a drawing table adjacent to the other end of said main frame, means carried by said rockover frame whereby a bottom board is temporarily held in position, and means simultaneously releasing said last named means and checking the movement of said rockover frame when in parallelism with said drawing table.

12. A molding machine embodying therein a main frame, a rockover frame mounted thereon, a table adjacent to one end of said main frame adapted to receive said rockover frame, a drawing table adjacent to the other end of said main frame, a clamp bar adapted to temporarily hold a bottom board in place, a pivotal support therefor having an axis of rotation adjacent that of said rockover frame, latch pins supported by said bar, coöperating latch members comprising cylinders carried by said rockover frame and extending longitudinally thereof, a spring pressed plunger seated therein and adapted to engage said pins, and laterally projected pins carried by said plungers, and posts adjacent said drawing table adapted to engage said last named pins, whereby said latch pins may be automatically released and the maximum movement of said rockover frame defined.

13. A molding machine embodying therein a main frame, a rockover frame mounted thereon, a table adjacent one end of said frame, adapted to receive said rockover frame, a vertically depressible drawing table adjacent the other end of said main frame, a clamp bar adapted to temporarily hold a bottom board in place, arms pivoted upon and movable with said drawing table, supporting said clamp bar, latch pins supported by said bar, coöperating latch members comprising cylinders carried by said rockover frame and extending longitudinally thereof, a spring pressed plunger seated therein and adapted to engage said pins, and laterally projected pins carried by said plungers, and posts adjacent said drawing table adapted to engage said last named pins, whereby said latch pins may be automatically released and the maximum movement of said rockover frame defined.

14. A molding machine embodying therein a vertically depressible frame, a table pivoted adjacent one end thereof to said frame, and having a segmental slot adjacent the opposite end thereof, a strut carried by said frame, and adjustable means passing through said slot whereby said table may be angularly adjusted upon said frame.

15. A molding machine embodying therein an invertible mold, flask or core box carrying frame, oppositely disposed jaws thereon adapted to have movement toward and from each other, automatically acting means adapted to simultaneously move said jaws in opposite directions, a baseboard having oppositely presented angular cleats thereon adapted to be engaged by said jaws, a mold, flask or core box adapted to seat on said baseboard, said baseboard and said mold, flask or core box having a coöperating dovetailed groove or tongue thereon respectively, a wedge adapted to enter said groove and hold said parts against relative movement, and means whereby said jaws may be actuated in opposition to said means to permit the mounting of said baseboard upon, or its removal from said frame.

16. A molding machine embodying therein a rockover mold, flask or core box carrying frame, a baseboard, means whereby said baseboard is detachably mounted on said frame, a mold, flask or core box adapted to seat on said baseboard, coöperating means carried by the top of said baseboard and the bottom of said mold, flask or core box whereby the latter may be temporarily secured to the frame and means movable with said frame whereby a bottom board may be held in position relative to the mold, flask or core box, while said frame is being rocked over.

In witness whereof, said ARCHIBALD M. LOUDON for himself, and said ARCHIBALD M. LOUDON and HORACE W. PHILBROOK as administrators of JOHN GOW deceased, have hereunto affixed their signatures in the presence of two subscribing witnesses.

ARCHIBALD M. LOUDON,
*Pro se.*
ARCHIBALD M. LOUDON,
HORACE W. PHILBROOK,
*Administrators of John Gow, deceased.*
Witnesses:
LESLIE SCHOOLCRAFT,
WM. C. MARLETTE.

Copies of this patent may be obtained for five cents each, by addressing the "Commissioner of Patents, Washington, D. C."